(12) United States Patent
Snyder

(10) Patent No.: US 8,925,223 B2
(45) Date of Patent: Jan. 6, 2015

(54) LAMINATED SHEET CONSTRUCTION WITH THERMAL ADHESIVE SURFACE AND METHOD FOR MAKING SAME

(76) Inventor: Jeffrey W. Snyder, Mendham, NJ (US)

( * ) Notice: Subject to any disclaimer, the term of this patent is extended or adjusted under 35 U.S.C. 154(b) by 587 days.

(21) Appl. No.: 13/195,653

(22) Filed: Aug. 1, 2011

(65) Prior Publication Data
US 2013/0001281 A1 Jan. 3, 2013

Related U.S. Application Data

(60) Provisional application No. 61/503,319, filed on Jun. 30, 2011.

(51) Int. Cl.
| G09F 21/16 | (2006.01) |
| B65D 73/00 | (2006.01) |
| B32B 7/12 | (2006.01) |
| B32B 27/10 | (2006.01) |
| B32B 27/32 | (2006.01) |
| B32B 27/34 | (2006.01) |
| B32B 27/36 | (2006.01) |
| B32B 29/08 | (2006.01) |

(52) U.S. Cl.
CPC ........ *B65D 73/0057* (2013.01); *B65D 73/0092* (2013.01); *B32B 7/12* (2013.01); *B32B 27/10* (2013.01); *B32B 27/32* (2013.01); *B32B 27/34* (2013.01); *B32B 27/36* (2013.01); *B32B 29/08* (2013.01); *B32B 2255/10* (2013.01); *B32B 2255/26* (2013.01); *B32B 2439/00* (2013.01)
USPC ............................... 40/312; 206/461; 53/452

(58) Field of Classification Search
USPC ................. 40/312; 206/461; 53/452
See application file for complete search history.

(56) References Cited

U.S. PATENT DOCUMENTS

| 3,972,417 A | * | 8/1976 | Iten et al. ...................... 206/354 |
| 5,190,997 A | | 3/1993 | Lindemann et al. |
| 5,236,749 A | | 8/1993 | Ewing |
| 5,486,390 A | | 1/1996 | Burns et al. |
| 5,975,304 A | | 11/1999 | Cain |
| 6,010,784 A | | 1/2000 | Peterson |
| 6,210,522 B1 | * | 4/2001 | Singh et al. ..................... 347/50 |
| 6,691,870 B1 | | 2/2004 | Palm et al. |
| 7,051,876 B2 | | 5/2006 | Grosskopf |
| 7,144,635 B2 | | 12/2006 | Hawes et al. |
| 7,337,593 B2 | * | 3/2008 | Blum et al. ..................... 53/453 |
| 2002/0088855 A1 | | 7/2002 | Hodes |
| 2003/0203141 A1 | | 10/2003 | Blum et al. |
| 2005/0077202 A1 | | 4/2005 | Blum et al. |
| 2005/0079307 A1 | | 4/2005 | Blum |
| 2005/0284789 A1 | | 12/2005 | Carespodi |
| 2006/0091037 A1 | * | 5/2006 | Grote et al. ................... 206/471 |
| 2007/0031645 A1 | * | 2/2007 | Wilde et al. ................... 428/204 |

FOREIGN PATENT DOCUMENTS

JP 2009184714 A 8/2009

* cited by examiner

*Primary Examiner* — Gary Hoge
(74) *Attorney, Agent, or Firm* — Levine Mandelbaum PLLC

(57) ABSTRACT

A laminated sheet construction for use in product packages has a substrate layer onto which there is laminated a transparent solid plastic film with an exposed surface having a transparent thermosetting adhesive coating. The surface beneath the coating may be printed with text and/or graphics which is visible through the film and adhesive. A container for a product may be directly affixed to the adhesive surface. Panels of the laminated substrate may be bonded together for increased strength or for capturing the flange of a container which can project through a window in one of the panels while displaying printing on the other panel through the window.

12 Claims, 4 Drawing Sheets

LAMINATED SHEET CONSTRUCTION WITH THERMAL ADHESIVE SURFACE AND METHOD FOR MAKING SAME

BACKGROUND OF THE INVENTION

The present invention relates primarily to the construction of product display packages although it can have other applications. More particularly, the present invention is directed to providing printed substrates made of paper, cardboard, plastic and the like with transparent thermal adhesive surfaces to which items may be readily adhered. Such items may include, for example, transparent plastic containers for products to be displayed in their packages.

Prior art transparent containers which hold products are applied to backing cards by using a sandwich of two overlapping cards into which a window has been cut in one or both of the panels. A plastic container having integral flanges is then placed in the window with the flanges sandwiched between the overlapping card panels which are cemented together. Although it is know to produce web materials which have thermosetting adhesive surfaces, until now, their application has been limited to serving as outer layers for packages for security and aesthetics.

Referring to FIG. 1 of the drawings, it is known to coat a web of paper, cardboard, plastic or similar stock 1 with an adhesive 3, either a liquid drying one or a molten extrusion. Thereafter a web of plastic film 5 is layered over the adhesive to form a laminate of the paper, cardboard, plastic or similar stock and the web of plastic film. Next an extrusion of a molten thermal adhesive 7 is coated onto the surface of the plastic film to provide a laminate 9 having a paper, cardboard, plastic or similar material substrate and a thermal adhesive surface 11.

The prior art process by which thermal adhesive is applied requires that the thermal adhesive material be heated to above its melting point and layered onto a continuous web fed at a uniform rate between a supply spool and a takeup spool without starting and stopping or otherwise upsetting the rate of travel of the web as the coating of molten thermal adhesive is uniformly applied. The laminate 9 can only be produced from web materials which are conveyed through a process line wherein the adhesives and plastic film are assembled.

In some applications it is desired to print relatively small sheets of paper, cardboard, plastic or similar material and thereafter apply a thermal adhesive to the printed surface. Such printed sheets cannot be treated in a web conveyor apparatus. Nor can a molten thermal adhesive be applied to single sheets of paper, cardboard, plastic or the like.

Referring to FIG. 2 of the drawings, it is also known in the art to produce plastic film material in rolls onto which a thermal adhesive has been coated in a manner similar to that shown in FIG. 1 but without the paper, cardboard, plastic or similar material substrate. A laminate of plastic film material 13 coated on one side with a thermal adhesive has been found useful for enhancing the appearance and strength of containers used in product packaging. In such applications, the plastic film laminate 13 is applied to a package 15 made of paper, cardboard, plastic or similar stock with the thermal adhesive side of the plastic film 13 against one or more of the panels which form the package. After the laminate 13 is adhered to the package by application of heat, the opposite uncoated side of the plastic film provides a glossy, satin, or matte (depending of the film surface) look and feel to the package which makes it aesthetically attractive and resistant to tearing.

SUMMARY OF THE INVENTION

The present invention allows for a single panel to receive a transparent plastic container with the flanges adhered directly to the printed surface of the card without necessity of an overlapping panel to secure the flanges to the card.

Packages may also be formed by folding the printed substrate onto itself and providing a window through one panel of the substrate through which a printed overlapping panel can be seen.

In another application, two panels may be affixed together with one or more edges of one panel offset from the corresponding edges of a mated panel to display graphics or other printing on a border of the combination.

In accordance with the invention a thermal laminating film is used in an unconventional manner. Such thermal laminating films, which are commercially available, e.g., from Protect-all, Inc. of Darien, Wis., are typically designed to be applied to a substrate of paper, cardboard, plastic or similar sheet materials by heating through the film and activating a thermal adhesive to bond/adhere it to the substrate. The present invention teaches the application of an adhesive to the film side of a thermal laminating film, and laminating the film side to a sheet or roll of paper, cardboard, plastic or similar material, thus allowing the heat seal layer to be exposed. This allows the formation of new and unique packaging designs.

Applicant has discovered a method of providing printed substrates comprising sheets or rolls of paper, cardboard, plastic, or similar materials with a thermal adhesive surface. The sheets or rolls may be printed with appropriate graphics and text for use in product packaging. The laminates formed in accordance with the invention can be cut, stacked and handled in a manner similar to that of sheets and rolls, printed or not, and containing no adhesive surface. The sheets and rolls are always ready for use to be adhered to a container or to themselves when folded over or cut into facing panels, by the application of heat. Moreover, the application of the film to the paper, cardboard, plastic, or similar materials imbues the materials with barrier properties that prevent oils, fragrances and scents from passing through the materials. Also, the addition of film to the substrate can improve tear and tamper resistance where necessary depending on the choice of film.

The thermal laminating films can be applied to a variety of substrates including, but not limited to, light weight paper from 60 lb C1/s text weight to 36 pt paper board. Other suitable substrate materials include chip boards; laminated constructions of board to board or chip board to chip board up to and including 125 pt.; corrugated in single face or double face, in either white, black, kraft, or colors, from grades B, C, E, F and N Flute; plastics from 2 mil to 90 mil in thickness; and foam board up to and including ½ inch thick.

For applying the thermal laminating film to substrates formed as individual sheets, a roll of the thermal laminating film is mounted on a sheet fed laminating machine. The roll is mounted inversely with respect to the orientation in which it is mounted for prior art applications. A liquid adhesive is applied to the film side of the roll. From the opposite side of the sheet fed laminating machine, sheets of paper, cardboard (including corrugated), plastic or similar materials are fed. The thermal film is then joined to one side of the sheet. One of the unique features of the invention is the variety of substrates to which the thermal laminating film can be applied. Moreover, the sheets can be preprinted on one or both sides.

It is therefore an object of the invention to provide a laminated sheet construction with an exposed thermal adhesive surface to which other materials may be applied upon application of heat.

It is another object of the invention to provide a laminated sheet construction with an exposed thermal adhesive surface that may include printed text and/or graphics viewable through the adhesive surface.

It is also an object of the invention to provide a laminated construction, panels of which can be bonded together by application of heat to create packages for products.

It is a further object of the invention to provide a laminated sheet construction having two panels with differently printed surfaces bonded together with a portion of the printing on one panel viewable through a window in the other panel.

It is still a further object of the invention to provide a laminated sheet construction having two panels with differently printed surfaces bonded together with a portion of the printing on one panel viewable as a border alongside the other panel.

Other and further objects of the invention will be apparent from the following drawings and description of the preferred embodiments of the invention.

DESCRIPTION OF THE PREFERRED EMBODIMENTS

Figure 1:
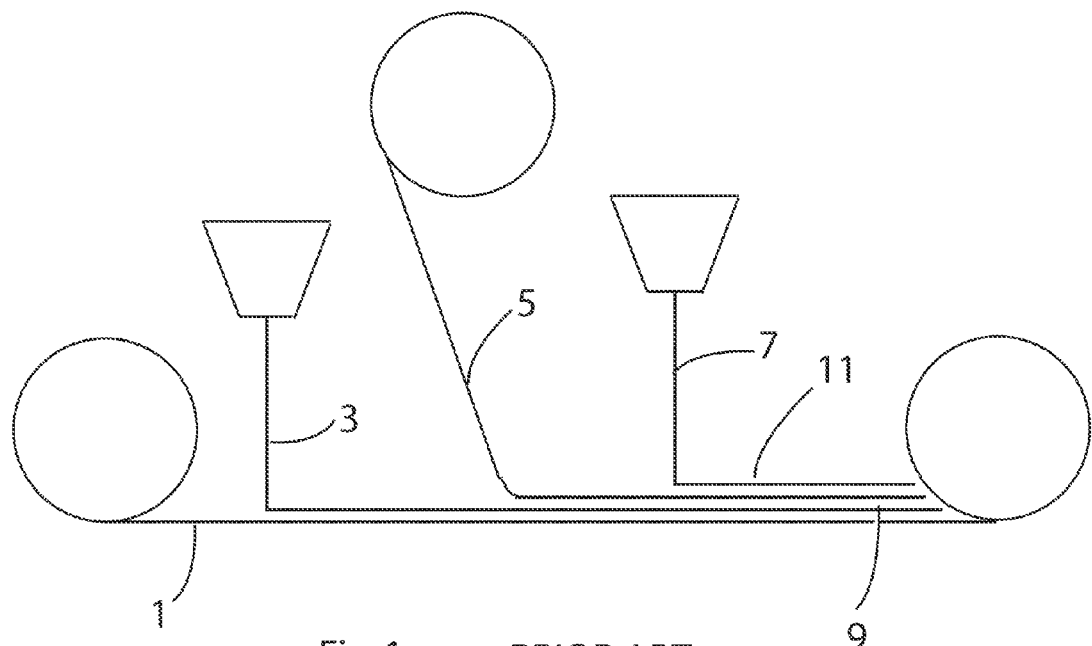
FIG. 1 is a schematic view illustrating a prior art method of making a laminated construction.
Figure 2:
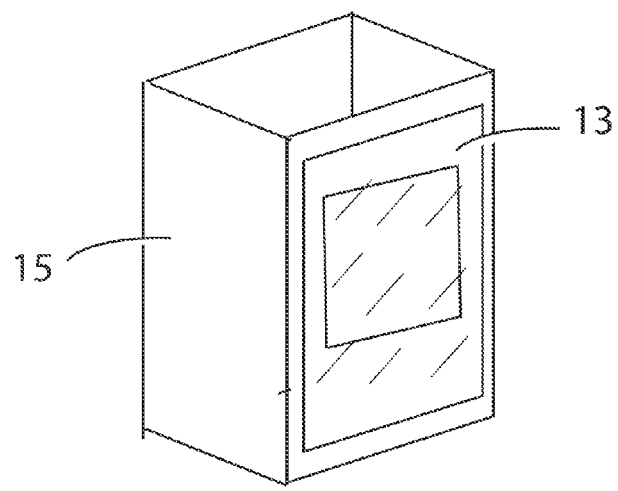
FIG. 2 is a perspective view of a prior art laminated construction.
Figure 3:
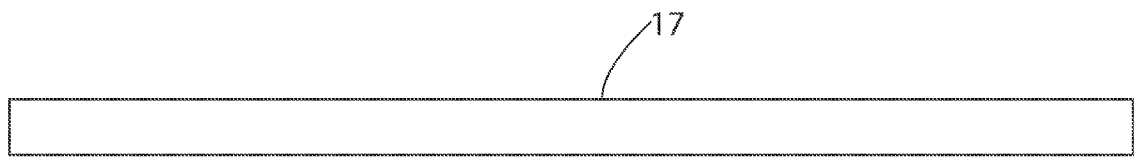
FIG. 3 is a side elevation view of a component of a laminated sheet construction in accordance with the preferred embodiment of the invention.
Figure 4:
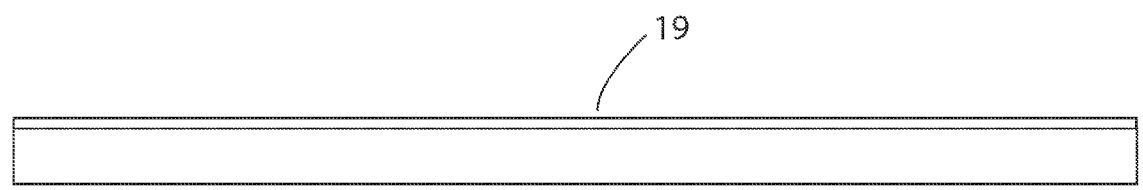
FIG. 4 is a side elevation view of another component of a laminated sheet construction in accordance with the preferred embodiment of the invention.
Figure 5:
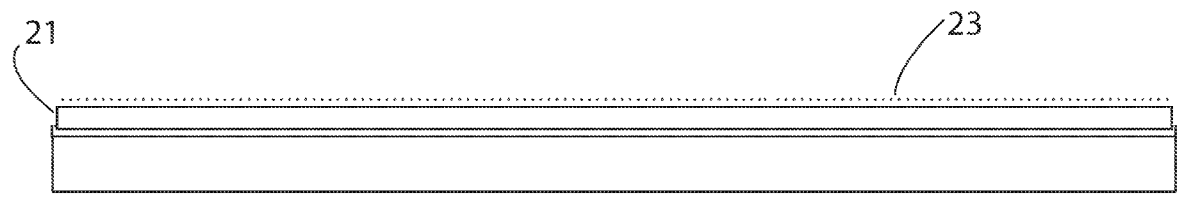
FIG. 5 is a side elevation view of a laminated sheet construction assembled from the components shown in FIGS. 3 and 4 in accordance with the preferred embodiment of the invention.
Figure 6:
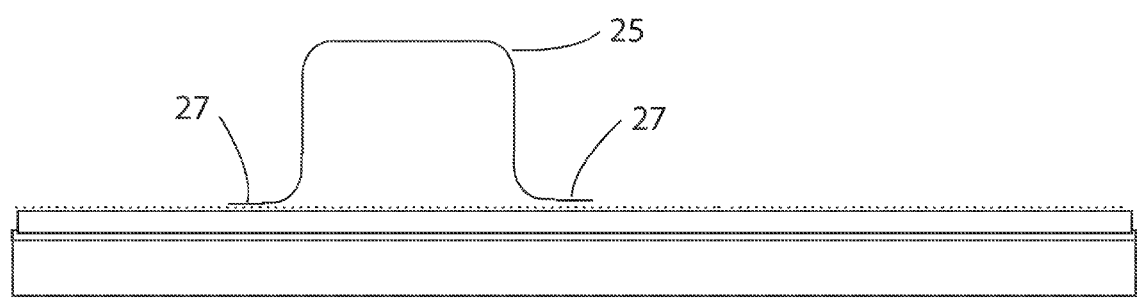
FIG. 6 is a side elevation view of a laminated sheet construction in accordance with a first alternate preferred embodiment of the invention.

Referring to FIG. 3 of the drawings, in accordance with the present invention a paper, cardboard, plastic, or similar material substrate 17 is provided with an optionally printed upper surface. A sheet of plastic solid film material having a layer of thermal setting or thermoplastic adhesive on one side is coated on its opposite side, i.e., film side, with a setting liquid adhesive 19 as shown in FIG. 4. Thereafter the plastic film 21 having one side coated with a thermal adhesive 23 is layered onto the surface on the paper, cardboard, plastic or similar material substrate with the side of the plastic film to which the liquid adhesive 19 has been applied against the paper, cardboard, plastic, or similar material substrate 17 and the thermal adhesive side 23 of the plastic film 21 facing away from the paper, cardboard, plastic or similar material substrate 17. This is unlike the conventional method of application wherein the thermal adhesive side of the plastic film is applied directly to the surface of the paper, cardboard, plastic or similar material substrate as in FIG. 2. The liquid adhesive is then caused to set thereby bonding the film 21 to the substrate 17.

The thermal laminating films have two basic components, i.e., a base film and a thermal adhesive which has been extruded onto the base film. Solid film materials suitable for use as thermal films in the practice of the invention are available in many types of film and film thicknesses. The base film can be from 40 gauge (about mil) up to 7 mils in thickness. The most common films used in the base are Polyester (PET), polypropylene (OPP), nylon, acetate, and polylactide (PLA). All these films possess different characteristics and may be incorporated into the invention based on the requirements for an end use package. Protect-all, Inc. is one of many suppliers of commercially available thermal laminating films.

The thermal adhesive is an extrusion that can vary in thickness; most common is from ½ mil to 8 mils thick. The most common adhesive used is ethylene vinyl acetate copolymer (EVA), but ethylene methyl acrylate copolymers (EMA) or a combination thereof may be used. Other suitable adhesives can include ethylene acrylic acrylate (EAA), ethylene ethyl acrylate (EEA) or ethylene methyl acidic acrylate (EMAA).

One commercially available liquid adhesive found to be satisfactory is MOR-GLOSS™ 552A used in combination with a coreactant, MOR-GLOSS™ CR-40B, each of which is manufactured by Dow Chemical Corporation. Many other adhesives will work in the invention as will be known to those skilled in the art. The 552A adhesive component is a water based acrylic emulsion and the CR40-B is a water based isocyanate coreactant. When mixed and dried the two components react forming a high molecular weight acrylic/urethane adhesive. Many other adhesives of either water-based, solvent-based or Ultra Violet (UV) curing style may be substituted provided that the selected adhesive is suitable for securing the film to the selected substrate and any further processing requirements called for by the package design.

The liquid adhesive is permitted to dry and set leaving a paper, cardboard, plastic or similar material substrate, having an optionally printed side, with a transparent thermal adhesive over that side of the substrate. The laminated sheet construction based on paper, cardboard, plastic or a substrate of similar material may now be used as a presentation card for a product enclosed in a transparent plastic container 25 through which the product and the printing on the substrate may be viewed. The product can be placed within the plastic container as the container is placed onto the thermal adhesive surface of the laminated substrate and a flange 27 of the container 25 is heated for welding the container to the substrate.

Figure 7:
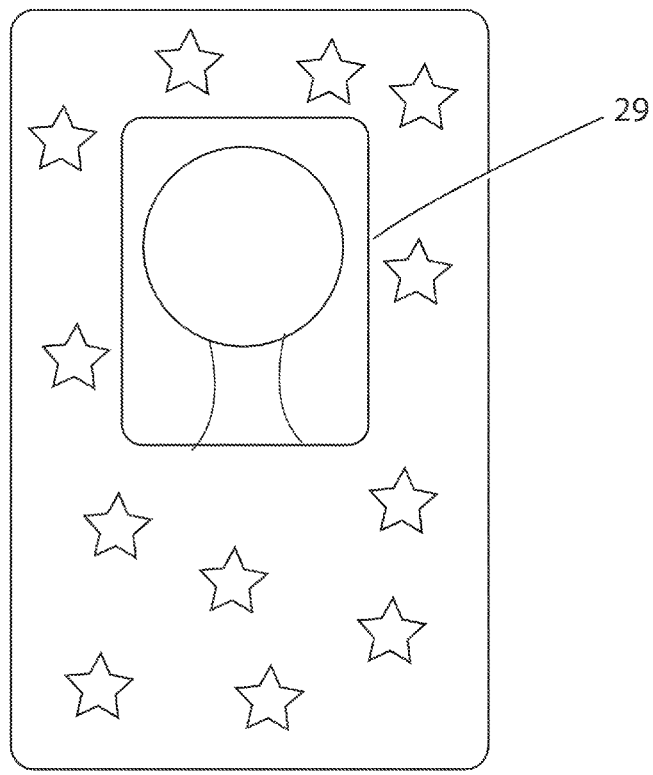
FIG. 7 is a plan view of a laminated sheet construction in accordance with a second alternate preferred embodiment of the invention shown in FIG. 7.
Figure 8:
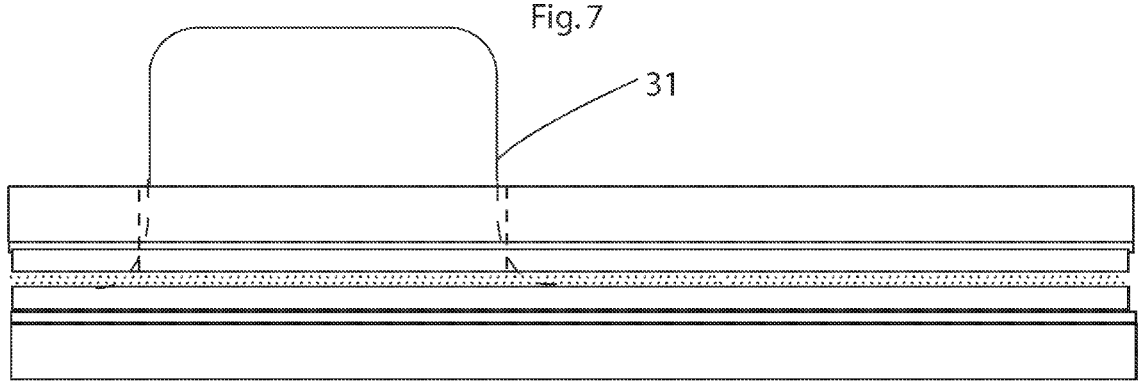
FIG. 8 is a side elevation view of the second alternate preferred embodiment of the invention.

Referring to FIG. 7, in another embodiment of the present invention, a window 29 can be cut into a sheet of the printed paper, cardboard, plastic or similar material substrate that has been coated with the thermal adhesive plastic film. Two separate congruent panels can be mated in registration as shown in FIG. 8 so that the window overlaps a printed area of the laminate which is visible through the window. Alternatively, two adjacent panels of the same laminated substrate may be folded together about a fold line in the laminated substrate to achieve a similar effect.

The flange of a transparent plastic container 31 can be sandwiched between the overlapping panels of the laminate with the container 31 projecting through the window. The flange of the container surrounds an opening to a chamber in the container. The flange has a dimension large enough to prevent the flange from passing through the window, so that when the panels are bonded together, the flange is captured between the bonds panels. If the thermal adhesive surface on which the flange is mounted is melted to adhere to the flange, the container will be retained even if the window is large enough to allow the flange to pass through it. By making the window small enough to pass the main body of the container, but not the flange, greater security for preventing dislodgement or removal of the container and its contents may be achieved. Also the appearance of the overall package, including the laminate construction with the container and its contents may be more aesthetically pleasing than if the flange were exposed through the window.

A product may be placed in the container before the overlapping panels are sealed. After the panels are adhered to each other by heating the facing thermal adhesive surfaces, the contents of the container, e.g., the product, can be visible in the container with printing or other graphics in the background of the window.

Figure 9:
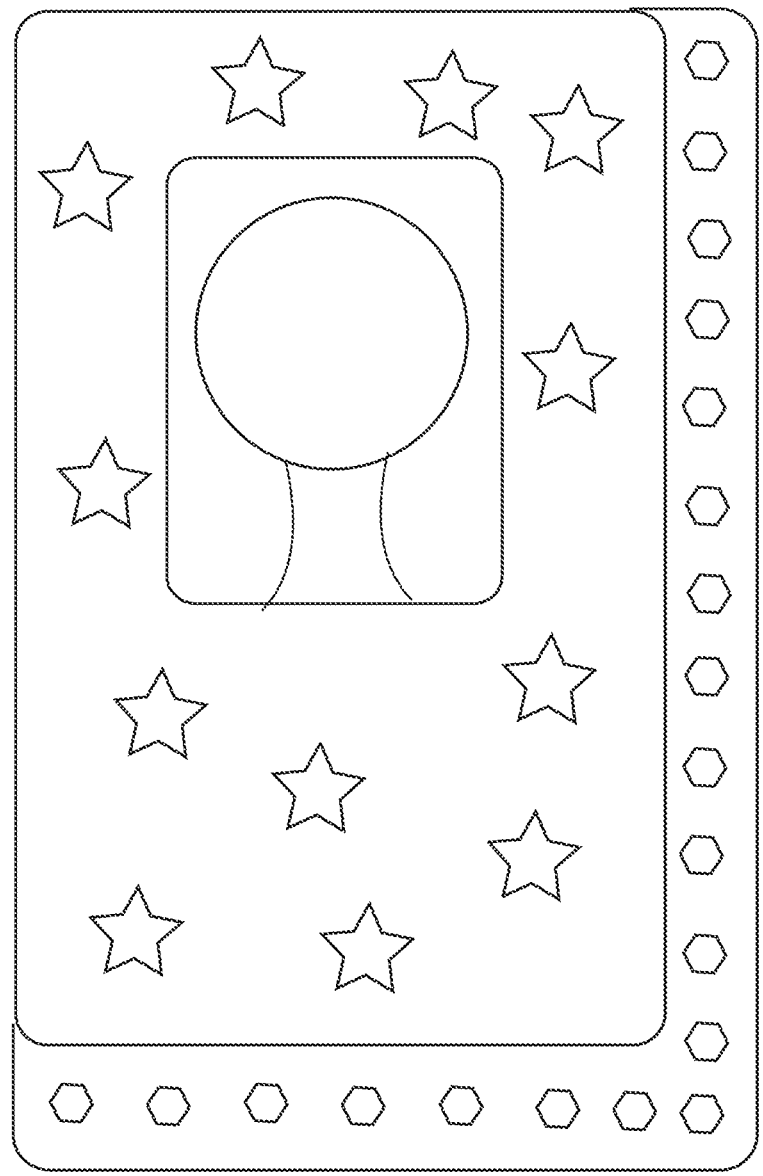
FIG. 9 is a plan view of a laminated sheet construction in accordance with a third alternate preferred embodiment of the invention.

Referring to FIG. 9, the laminate of the present invention can have other uses, for example, where decorative graphics or printing is desired to be shown along one or more borders of a package card. In such instances, one panel of the laminate can be folded over onto the other, or two separate panels can be joined face-to-face, with the panels out of registration so that the printing on the inside of one of the panels, which is different from the printing on the overlying panel, shows along the edge of the package card laminate construction thereby providing a contrast between the face of the package and adjacent border.

For improving the structural integrity of a club style package, in accordance with the invention, the thermal laminating film can be applied to both sides of a corrugated/chipboard sheet which can be integrated into the middle of a club style package. This arrangement offers the ability to heat seal two plain or preprinted sheets together with a strong corrugated/chipboard middle core. The resulting construction offers the ability to heat seal a package together while simultaneously building in tamper resistance to a degree that can be determined by the choice of composition and thickness of the base film in the thermal laminating film.

It is to be appreciated that other and further modifications and variations may be made to the embodiments herein disclosed without departing from the spirit and scope of the invention.

The invention is not limited to substrates in sheet form and can be used with substrates in roll form. On a roll-fed flexographic printing machine rolls of paper, cardboard, plastic or similar materials can be fed and printed, foil stamped, decorated and die cut in line, and the thermal laminating film can then be applied, to produce a finished product in one pass. Application of thermal laminating film to substrates in roll form is most economical in large volume production versus sheet feeding which is considered to be slower and more costly.

Unlike prior art packaging materials which cannot be printed and then have a heat seal material applied over the printed graphics, the present invention allows a heat seal material to be applied over a printed surface. On a roll-fed Flexo press one can print the roll of paper, cardboard, plastic or similar material, decorate, foil stamp, and perform other process steps normally done on a substrate in roll form and then coat the film side of the thermal laminating film with an adhesive for application of the thermal laminating film to the decorated roll. The laminated roll can then be taken off the machine or optimally die cut in line to finish the production process of the end product.

It is to be noted that with either a sheet or roll process, the thermal laminating film can be applied to either one both sides of the paper, cardboard, plastic or similar material substrate.

What is claimed is:

1. A method of making a laminated sheet construction comprising
    coating a sheet of solid film material, which a barrier to oils, fragrances or scents, with a layer of a thermoplastic adhesive to form an adhesive side of said sheet of solid film material, an opposite side of said solid film material being a film side of said solid film material,
    coating said film side of said solid film material with a setting adhesive,
    placing said sheet of solid film material onto a substrate of sheet material with said film side of said solid film material facing a front surface of said substrate, and
    causing said setting adhesive to set for adhering said sheet of solid film material to said front surface of said substrate thereby forming a laminated substrate having a thermoplastic adhesive surface.

2. A method according to claim 1 further comprising mating, face-to-face, a first panel of said laminated substrate and a second panel of said laminated substrate, with an adhesive surface of one of said first panel and said second panel engaging the other of said first panel and said second panel, and
    heating the thermoplastic adhesive of said engaging adhesive surface to bond said first panel and said second panel together.

3. A method according to claim 2 further comprising
    before mating said first panel and said second panel, opening a window into said first panel and inserting a portion of a container through said window, said container having a flange surrounding an opening to a chamber in said container with a dimension large enough to prevent said flange of said container from passing through said window, whereby when said first panel and said second panel are bonded together, said flange is captured between said first panel and said second panel.

4. A method according to claim 2 wherein said first panel and said second panel are adjacent panels of the same laminated substrate, comprising mating said first panel and said second panel by folding said first panel and said second panel together about a fold line in said laminated substrate between said first panel and said second panel.

5. A method according to claim 2 wherein said first panel and said second panel are congruent and mated in registration.

6. A method according to claim 2 wherein said first panel and said second panel are mated with at least one pair of corresponding edges offset with respect to one another so that at least a portion of a border of one of said first panel and said second panel is visible when the other of said first panel and said second panel is viewed.

7. A method according to claim 6 further comprising printing said border of one of said first panel and said second panel with an image different from an image on the other of said first panel and said second panel so that there is a contrast between the border of said one of said first panel and said second panel and the other of said first panel and said second panel.

8. A method according to claim 1 further comprising printing said front surface of said substrate material before placing said sheet of solid film material onto said front surface of said substrate of sheet material.

9. A method according to claim 1 wherein said setting adhesive is coated onto said solid film in a liquid state.

10. A method according to claim 1 wherein said solid film comprises a plastic.

11. A method according to claim 10 wherein said plastic is selected from the group consisting of polyester (PET), polypropylene (OPP), nylon, acetate, and polylactide (PLA).

12. A method of making a laminated sheet construction comprising
- coating a sheet of solid film material with a layer of a thermoplastic adhesive to form an adhesive side of said sheet of solid film material, an opposite side of said solid film material being a film side of said solid film material,
- coating said film side of said solid film material with a setting adhesive,
- placing said sheet of solid film material onto a substrate of sheet material with said film side of said solid film material facing a front surface of said substrate,
- causing said setting adhesive to set for adhering said sheet of solid film material to said front surface of said substrate thereby forming a laminated substrate having a thermoplastic adhesive surface,
- placing a flange of a container surrounding an opening to a chamber in said container onto said thermoplastic adhesive surface of said laminated substrate, and
- heating said thermoplastic adhesive to adhere said container to said adhesive side of said sheet of solid film material.

* * * * *